United States Patent
Ishikawa et al.

(10) Patent No.: US 10,505,218 B2
(45) Date of Patent: Dec. 10, 2019

(54) NON-AQUEOUS ELECTROLYTE SECONDARY BATTERY

(71) Applicant: Sanyo Electric Co., Ltd., Daito-shi, Osaka (JP)

(72) Inventors: Takeshi Ishikawa, Mie (JP); Tomoki Shiozaki, Osaka (JP); Mineyasu Aoto, Tottori (JP)

(73) Assignee: SANYO Electric Co., Ltd., Daito-shi (JP)

( * ) Notice: Subject to any disclaimer, the term of this patent is extended or adjusted under 35 U.S.C. 154(b) by 214 days.

(21) Appl. No.: 15/642,591

(22) Filed: Jul. 6, 2017

(65) Prior Publication Data

US 2017/0309951 A1    Oct. 26, 2017

Related U.S. Application Data

(63) Continuation of application No. PCT/JP2016/000265, filed on Jan. 20, 2016.

(30) Foreign Application Priority Data

Jan. 29, 2015 (JP) .................................. 2015-015986

(51) Int. Cl.
*H01M 4/62* (2006.01)
*H01M 4/36* (2006.01)
(Continued)

(52) U.S. Cl.
CPC ......... *H01M 10/052* (2013.01); *H01M 4/362* (2013.01); *H01M 4/485* (2013.01); *H01M 4/62* (2013.01); *H01M 2004/028* (2013.01)

(58) Field of Classification Search
CPC .......... H01M 4/62; H01M 4/36; H01M 4/485; H01M 4/02; H01M 10/052
See application file for complete search history.

(56) References Cited

U.S. PATENT DOCUMENTS 5,989,747 A * 11/1999 Tanaka ..................... H01M 4/04
                                                                 429/209
6,013,388 A *  1/2000 Stadnick ............... H01M 2/307
                                                                 429/120

(Continued)

FOREIGN PATENT DOCUMENTS

CN        1753204 A     3/2006
CN      102447088 A     5/2012

(Continued)

OTHER PUBLICATIONS

International Search Report dated Apr. 12, 2016, issued in counterpart International Application No. PCT/JP2016/000265 (2 pages).

(Continued)

*Primary Examiner* — Kenneth J Douyette
(74) *Attorney, Agent, or Firm* — Westerman, Hattori, Daniels & Adrian, LLP; Stephen B. Parker

(57) ABSTRACT

A positive electrode in a lithium secondary battery includes an insulating tape that covers a welded part between a positive electrode tab and a positive electrode current collector-exposed surface. The insulating tape has a multilayer structure including an organic material layer, a composite material layer containing an organic material and an inorganic material, and an adhesive layer. The inorganic material in the composite material layer accounts for 20% or more of the weight of the composite material layer.

18 Claims, 2 Drawing Sheets

(51) Int. Cl.
  *H01M 4/02*  (2006.01)
  *H01M 10/052* (2010.01)
  *H01M 4/485* (2010.01)

(56) References Cited

U.S. PATENT DOCUMENTS

| | | | |
|---|---|---|---|
| 2001/0046623 A1 | 11/2001 | Akahira | |
| 2003/0232243 A1 | 12/2003 | Hong | |
| 2004/0115528 A1* | 6/2004 | Helmich | H01M 2/021 |
| | | | 429/181 |
| 2006/0093922 A1 | 5/2006 | Kim et al. | |
| 2012/0082891 A1 | 4/2012 | Ahn | |
| 2012/0156564 A1* | 6/2012 | Kim | C09J 7/22 |
| | | | 429/211 |
| 2013/0011672 A1 | 1/2013 | Okamoto et al. | |
| 2014/0120417 A1 | 5/2014 | Matsushita et al. | |

FOREIGN PATENT DOCUMENTS

| | | |
|---|---|---|
| JP | 10-247489 A | 9/1998 |
| JP | 2000-138053 A | 5/2000 |
| JP | 4065915 B2 | 3/2008 |
| JP | 2010-192462 A | 9/2010 |
| JP | 2011-202013 A | 10/2011 |
| JP | 2014-89856 A | 5/2014 |

OTHER PUBLICATIONS

English translation of Search Report dated Apr. 23, 2019, issued in counterpart CN Application No. 201680003499.9 (2 pages).

\* cited by examiner (A)

(B)

NON-AQUEOUS ELECTROLYTE SECONDARY BATTERY

TECHNICAL FIELD

The present invention relates to non-aqueous electrolyte secondary batteries.

BACKGROUND ART

There have been proposed lithium secondary batteries in which the positive electrode or the negative electrode is highly insulated by using a protective tape.

Patent Literature 1 discloses a lithium secondary battery in which breakage of the current collector at a part where the current collector is in contact with the lead is suppressed.

FIG. 4 illustrates the structure of the positive electrode of the lithium secondary battery disclosed in Patent Literature 1, where FIG. 4(A) is a partial top view observed from one main surface side of the current collector, and FIG. 4(B) is a sectional view taken along line L1-L1 in FIG. 4(A). In FIG. 4, the reference character 21A indicates a current collector and the reference character 21B indicates an active layer.

In a double-sided uncoated part 21b, a protective layer 28 having a rectangular plane outer shape is famed on a positive electrode current collector-exposed surface 21a. The protective layer 28 is formed approximately in the middle of the double-sided uncoated part 21b. Part of the middle portion of the protective layer 28 is interposed between the lower end portion of the lead 25 and the positive electrode current collector-exposed surface 21a such that part of the protective layer 28 is surrounded by the lower edge of the lead 25, part of the two-side edges of the lead 25, and the positive electrode current collector-exposed surface 21a. Examples of the protective layer 28 include a resin layer, an inorganic material layer, and the like. Examples of the resin layer include a resin film and a resin tape. Examples of the resin film include a resin coating film containing a resin, such as a PVDF (polyvinylidene fluoride) film. Examples of the resin tape include a PP (polypropylene) tape, a PI (polyimide) tape, and a PET (polyethylene terephthalate) tape. Examples of the inorganic material layer and the like include an inorganic tape. The protective tape 27 covers the positive electrode current collector-exposed surface 21a, the lead 25, and the protective layer 28 on one main surface side of the positive electrode current collector 21A and covers the positive electrode current collector-exposed surface 21a on the other main surface side of the positive electrode current collector 21A. The protective tape 27 is intended to, for example, prevent heat generation of the battery if the positive electrode 21 comes into contact with the negative electrode 22 because of a fracture of the separator or the like under abnormal battery conditions. The protective tape 27 is, for example, a resin tape.

As an example for using a tape at a different position, Patent Literature 2 discloses that an insulating tape is famed of a composite material tape, and the composite material tape includes an organic material forming a base layer and an inorganic material dispersed in the organic material. The inorganic material content is 20% to 80% of the total weight of the composite material tape.

CITATION LIST

Patent Literature

PTL 1: Japanese Published Unexamined Patent Application No. 2014-89856

PTL 2: Japanese Published Unexamined Patent Application No. 2010-192462

SUMMARY OF INVENTION

Technical Problem

Patent Literature 1 is based on the assumption only about the abnormal mode caused by foil breakage and fails to prevent a short circuit caused by foreign matter (having conductivity). In particular, in order to prevent a short circuit in case of contamination of foreign matter in the welded part between the positive electrode tab and the positive electrode plate which face the negative electrode, both thermal resistance and piercing strength are needed at the same time. The term "thermal resistance" as used herein refers to a property of preventing or reducing deformation and deterioration of the tape caused by heat. As a result, the heat generation of the battery caused by a continuous short circuit can be prevented or reduced. However, the inorganic material content needs to be increased in order to ensure the thermal resistance of the base material of the tape. Unfortunately, the piercing strength decreases as the inorganic material content increases. In contrast, the inorganic material content needs to be reduced in order to ensure the piercing strength of the base material, which however, reduces the thermal resistance. In Patent Literature 1, the protective tape 27 prevents or reduces heat generation. Although a resin tape is used as the protective tape 27, to date, there have been no studies about the prevention or reduction of heat generation caused as a result of a short circuit, that is, both the thermal resistance and the piercing strength of the tape itself.

The present invention has been made in light of the above-described problem in the related art. An object of the present invention is to provide a non-aqueous electrolyte secondary battery that achieves both thermal resistance and piercing strength (mechanical strength).

Solution to Problem

A non-aqueous electrolyte secondary battery of the present invention includes a positive electrode including a positive electrode current collector, a positive electrode active material layer famed on the positive electrode current collector and containing a lithium transition metal composite oxide, and a positive electrode tab welded to a positive electrode current collector-exposed surface; a negative electrode including a negative electrode current collector and a negative electrode active material formed on the negative electrode current collector; and a separator between the positive electrode and the negative electrode. The positive electrode includes an insulating tape that covers a welded part between the positive electrode tab and the positive electrode current collector-exposed surface. The insulating tape has a multilayer structure including an organic material layer and a composite material layer containing an organic material and an inorganic material. The inorganic material in the composite material layer accounts for 20% or more of the weight of the composite material layer.

In one embodiment of the present invention, the inorganic material in the composite material layer preferably accounts for 35% or more and 80% or less of the weight of the composite material layer.

In another embodiment of the present invention, the composite material layer preferably has a thickness of 1 µm or more and 5 µm or less.

In still another embodiment of the present invention, the organic material layer is preferably a layer mainly composed of polyimide.

In still another embodiment of the present invention, the insulating tape preferably includes an organic material layer, a composite material layer famed on the organic material layer, and an adhesive layer formed on the composite material layer.

In still another embodiment of the present invention, the insulating tape preferably includes an organic material layer, a composite material layer famed under the organic material layer, and an adhesive layer formed on the organic material layer.

Advantageous Effects of Invention

According to the present invention, the insulating tape has both thermal resistance and piercing strength (mechanical strength) because of its multilayer structure including the organic material layer and the composite material layer. Therefore, according to the present invention, occurrence of a short circuit can be prevented or reduced and, even if a short circuit occurs, the thermal resistance can be ensured, which can suppress a rise in battery temperature.

BRIEF DESCRIPTION OF DRAWINGS

FIG. 4(A) is a view observed from one main surface side of the current collector, and FIG. 4(B) is a sectional view taken along line L1-L1 in FIG. 4(A).

DESCRIPTION OF EMBODIMENTS

Embodiments of the present invention will be described below with reference to the drawings.

Figure 1:
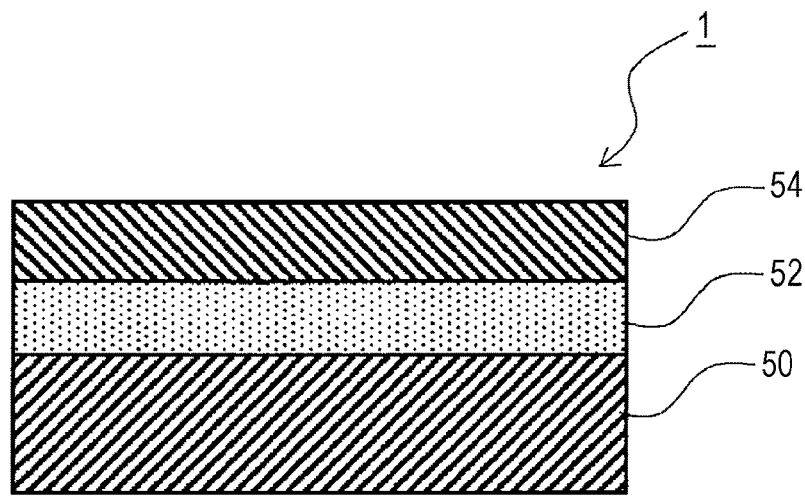
FIG. 1 is a partial sectional view of an insulating tape in an embodiment.

FIG. 1 is a partial sectional view of an insulating tape 1 according to an embodiment. The insulating tape 1 includes an organic material layer 50, a composite material layer 52 containing an organic material and an inorganic material, and an adhesive layer 54.

The organic material layer 50 is a layer mainly composed of an organic material and may contain, for example, PI (polyimide), PP (polypropylene), or PET (polyethylene terephthalate). In particular, PI having high piercing strength is preferably used. The organic material layer 50 may have any thickness and may have a thickness of, for example, 25 μm.

The organic material of the organic material layer preferably accounts for 90% by weight or more of the weight of the organic material layer and is preferably free of an inorganic material.

The composite material layer 52 contains an organic material as a base and an inorganic material dispersed in a predetermined powder form in the base layer. The organic material may be a rubber-based resin or acrylic-based resin, and preferably a resin that is the same as that in the adhesive layer. The inorganic material is preferably, for example, a silica sol.

The adhesive layer 54 is famed of a resin having an adhesive property at room temperature, for example, an acrylic-based resin.

As described above, the inorganic material content needs to be increased in order to ensure the thermal resistance of the base material of the tape, but the piercing strength decreases as the inorganic material content increases. In contrast, the inorganic material content needs to be reduced in order to ensure the piercing strength of the base material, which however, reduces the thermal resistance.

In this embodiment, both the thermal resistance and the piercing strength are achieved by having a three-layer structure of the organic material layer 50/the composite material layer 52/the adhesive layer 54 as illustrated in FIG. 1, instead of having a two-layer structure including a composite material layer and an adhesive layer as in the related art.

In other words, the thermal resistance of the composite material layer 52 is improved by setting the inorganic material content of the composite material layer 52 to 20% or more. Although such an inorganic material content reduces the piercing strength, the organic material layer 50 ensures the piercing strength, and therefore both the thermal resistance and the piercing strength can be ensured as the entire insulating tape 1.

The inorganic material content in the composite material is preferably 20% or more of the weight of the composite material, and is particularly preferably 35% to 80%. In other words, if the inorganic material content is less than 20%, the effect of increasing the thermal resistance is small. If the inorganic material content is as large as more than 80%, it is difficult for the insulating tape 1 to function as a tape.

The weight of the inorganic material is preferably less than 20% of the total weight of the layers excluding the weight of the adhesive layer 54 (the total weight of the organic material layer 50 and the composite material layer 52). The weight of the inorganic material is more preferably 10% or less, and still more preferably 5% to 10%. The piercing strength as well as the thermal resistance of the tape can be improved by increasing the weight ratio of the inorganic material in the composite material layer 52 and keeping the weight of the inorganic material low relative the entire tape.

The composite material layer 52 may also have any thickness and preferably has a thickness of 1 μm to 5 μm. In other words, if the thickness is as small as less than 1 μm, the composite material layer 52 has a small effect of increasing the thermal resistance. If the thickness is as large as more than 5 μm, it is also difficult for the insulating tape 1 to function as an insulating tape.

Since the mechanical strength (piercing strength) of the insulating tape 1 of this embodiment is still ensured in case of a short circuit caused by foreign matter, occurrence of a short circuit itself can be prevented or reduced.

Even if foreign matter causes a short circuit, the composite material layer 52 ensures the thermal resistance and thus may hinder a continuous short circuit.

Figure 4:
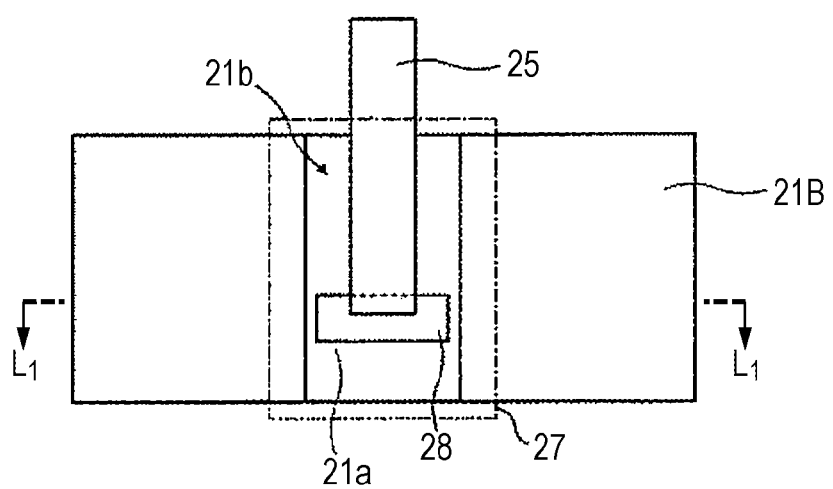
FIG. 4 illustrates explanatory views in the related art, where
Figure 4:
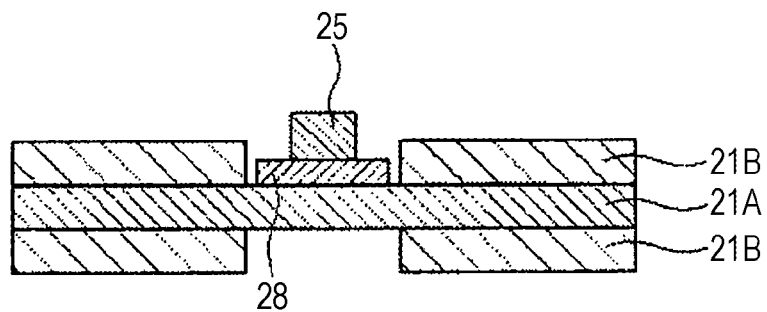

Like the protective tape 27 illustrated in FIG. 4, the insulating tape 1 of this embodiment can adhere to and entirely cover the positive electrode current collector (electrode plate) exposed-surface 21a and the joint area of the lead (electrode tab, positive electrode tab) 25. In other words, the insulating tape 1 adheres to both the lead in the middle blank section and the current collector-exposed portion. When the positive electrode current collector and the lead are both made of aluminum, the insulating tape 1 covers the aluminum-exposed portions. In the negative electrode as well as the positive electrode, the insulating tape 1 may entirely cover the welded portion.

The positive electrode, the negative electrode, the separator, and the non-aqueous electrolyte in this embodiment can be each made of a known material. Examples of the material are described below.

<Positive Electrode>

The positive electrode includes, for example, a positive electrode current collector (electrode plate) formed of metal foil or the like, and a positive electrode mixture layer formed on the positive electrode current collector. As the positive electrode current collector, for example, a foil made of a metal, such as aluminum, stable in the potential range of the positive electrode or a film having the surface layer made of the metal can be used. The positive electrode mixture layer preferably contains a conductive material and a binding material in addition to a positive electrode active material made of a lithium transition metal composite oxide. The positive electrode can be produced by, for example, applying a positive electrode mixture slurry containing a positive electrode active material, a binding material, and the like onto the positive electrode current collector to form coating films, and drying the coating films, followed by rolling to form a positive electrode mixture layer on each side of the current collector.

Specific examples of the lithium transition metal composite oxide include lithium cobalt oxide, lithium manganese oxide, lithium nickel oxide, lithium-nickel-manganese composite oxide, and lithium-nickel-cobalt composite oxide. To these lithium transition metal composite oxides, for example, Al, Ti, Zr, Nb, B, W, Mg, or Mo may be added.

As the conductive agent, carbon powders made of, for example, carbon black, acetylene black, Ketjenblack, and graphite may be used alone or in combination of two or more.

Examples of the binding agent include fluoropolymers and rubber-based polymers. Examples of fluoropolymers include polytetrafluoroethylene (PTFE), polyvinylidene fluoride (PVdF), and modified products thereof. Examples of rubber-based polymers include an ethylene-propylene-isoprene copolymer and an ethylene-propylene-butadiene copolymer. These polymers may be used alone or in combination of two or more.

<Negative Electrode>

The negative electrode is produced by dispersing, in water, a negative electrode active material of graphite powder, a thickener, and a binding agent at a predetermined weight ratio to from a negative electrode mixture slurry and applying the slurry to both sides of a copper foil.

As the negative electrode active material, a carbon material that can intercalate and deintercalate lithium ions can be used. In addition to graphite, for example, non-graphitizable carbon, graphitizable carbon, fibrous carbon, coke, and carbon black can be used. As a non-carbon material, silicon, tin, and alloys and oxides mainly composed of silicon and tin can be used.

As the binding agent, for example, PTFE can be used as in the case of the positive electrode, and a styrene-butadiene copolymer (SBR) or modified products thereof may be used. As the thickener, for example, carboxymethyl cellulose (CMC) can be used.

<Non-Aqueous Electrolyte>

For example, carbonates, lactones, ethers, ketones, esters can be used as a non-aqueous solvent (organic solvent) for the non-aqueous electrolyte. These solvents may be used in combination of two or more. For example, a solvent mixture containing a cyclic carbonate and a linear carbonate may be used. The cyclic carbonate may be, for example, ethylene carbonate, propylene carbonate, or butylene carbonate, and the linear carbonate may be, for example, dimethyl carbonate, ethyl methyl carbonate, or diethyl carbonate.

As an electrolyte salt for the non-aqueous electrolyte, for example, $LiPF_6$, $LiBF_4$, $LiCF_3SO_3$, and a mixture thereof can be used. The amount of the electrolyte salt dissolved in the non-aqueous solvent may be, for example, 0.5 to 2.0 mol/L.

<Separator>

An insulating porous sheet having ion permeability is used as a separator. Specific examples of the porous sheet include a microporous thin film, a woven fabric, and a non-woven fabric. Examples of suitable materials of the separator include olefin-based resins, such as polyethylene and polypropylene, and cellulose. The separator may be a stacked product having a cellulose fiber layer and a thermoplastic resin fiber layer made of olefin-based resin or the like. The separator may be a multilayer separator including a polyethylene layer and a polypropylene layer, or may have the surface coated with a resin, such as an aramid-based resin.

Next, Examples will be described.

EXAMPLES

Example 1

A positive electrode mixture slurry was prepared by mixing, as positive electrode active materials, 100 parts by weight of a lithium-nickel-cobalt-aluminum composite oxide represented by $LiNi_{0.88}Co_{0.09}Al_{0.03}O_2$, 1 part by weight of acetylene black (AB), and 1 part by weight of polyvinylidene fluoride (PVdF), and further adding a suitable amount of N-methyl-2-pyrrolidone (NMP) to the mixture. Next, the positive electrode mixture slurry was applied to both sides of a positive electrode current collector made of aluminum foil and was dried. The resulting product was cut into a predetermined electrode size and rolled with a roller to produce a positive electrode in which a positive electrode mixture layer was formed on each side of the positive electrode current collector. The crystal structure of $LiNi_{0.88}Co_{0.09}Al_{0.03}O_2$ is a rock-salt structure (hexagonal, space group R3-$m$). An uncoated area with no active material was formed at the end, and a positive electrode tab made of aluminum was fixed to the uncoated area by ultrasonic welding.

A thin copper foil was used as a negative electrode current collector. A negative electrode mixture slurry was prepared by dispersing, in water, a graphite powder, carboxymethyl cellulose (CMC) serving as a thickener, and styrene-butadiene rubber (SBR) serving as a binding agent at a mass ratio of 98:1:1. The negative electrode mixture slurry was applied to both sides of the current collector, dried, and compressed so as to have a predetermined thickness by roll pressing. An uncoated area with no active material was formed at the end, and a negative electrode tab made of nickel was fixed to the uncoated area by ultrasonic welding.

The welded part between the positive electrode tab and the electrode plate (positive electrode current collector) and the welded part between the negative electrode tab and the electrode plate (negative electrode current collector) were covered with an insulating tape. The prepared positive electrode plate and negative electrode plate were spirally wound with a separator interposed therebetween to produce a wound-type electrode body. In the separator, a thermal resistant layer in which a filler containing polyamide and alumina was dispersed was formed on one side of a microporous polyethylene membrane.

The electrode body was placed in a bottomed cylindrical battery case body 18 mm in outer diameter and 65 mm in height. A non-aqueous electrolyte solution was prepared by adding 1 mol/L of LiPF$_6$ to a solvent mixture containing ethylene carbonate (EC), ethyl methyl carbonate (EMC), and diethyl carbonate (DEC) at a volume ratio of 3:3:4. The non-aqueous electrolyte solution was injected into the battery case body. The opening of the battery case body was then sealed with a gasket and a sealing body to produce an 18650 cylindrical non-aqueous electrolyte secondary battery.

In the insulating tape, the organic material layer 50 had a thickness of 25 μm and contained an organic material at a weight composition ratio of 100, and the composite material layer 52 had a thickness of 1.0 μm and contained an inorganic material and an organic material at a weight composition ratio of 25:75. Polyimide (PI) was used in the organic material layer 50. In the composite material layer 52, an acrylic was used as an organic material and a silica sol was used as an inorganic material.

The weight of the inorganic material was 0.8% of the total weight excluding the weight of the adhesive layer.

Example 2

Example 2 was the same as Example 1 except that, in the insulating tape, the organic material layer 50 had a thickness of 25 μm and the composite material layer 52 had a thickness of 5.0 μm and contained an inorganic material and an organic material at a weight composition ratio of 35:65.

The weight of the inorganic material was 5% of the total weight excluding the weight of the adhesive layer.

Example 3

Example 3 was the same as Example 1 except that, in the insulating tape, the organic material layer 50 had a thickness of 25 μm and the composite material layer 52 had a thickness of 5.0 μm and contained an inorganic material and an organic material at a weight composition ratio of 70:30. The weight of the inorganic material was 10% of the total weight excluding the weight of the adhesive layer.

Example 4

Example 4 was the same as Example 1 except that, in the insulating tape, the organic material layer 50 had a thickness of 25 μm and the composite material layer 52 had a thickness of 1.0 μm and contained an inorganic material and an organic material at a weight composition ratio of 35:65.

The weight of the inorganic material was 1% of the total weight excluding the weight of the adhesive layer.

Comparative Example 1

Comparative Example 1 was the same as Example 1 except that, in the insulating tape, the organic material layer 50 had a thickness of 25 μm and the composite material layer 52 was not famed.

Comparative Example 2

Comparative Example 2 was the same as Example 1 except that, in the insulating tape, the organic material layer 50 had a thickness of 25 μm and the composite material layer 52 had a thickness of 5.0 μm and contained an inorganic material and an organic material at a weight composition ratio of 10:90.

The weight of the inorganic material was 1.5% of the total weight excluding the weight of the adhesive layer.

Comparative Example 3

Comparative Example 3 was the same as Example 1 except that, in the insulating tape, the organic material layer 50 was not present and the composite material layer 52 had a thickness of 5.0 μm and contained an inorganic material and an organic material at a weight composition ratio of 50:50.

The weight of the inorganic material was 50% of the total weight excluding the weight of the adhesive layer.

The non-aqueous electrolyte secondary batteries obtained as described above were measured for their piercing strength and battery temperature during a short circuit caused by foreign matter. The piercing strength was obtained by piercing the surface of the insulating tape with a needle and measuring the pressing force (N) when the penetration of the needle was found through external observation. The battery temperature during a short circuit caused by foreign matter was obtained by placing foreign matter on the uncoated area at the end on which an active material is not famed and which is covered with the insulating tape, and measuring the temperature of the battery at the side during a forcible short circuit with a thermocouple in accordance with JIS C 8714.

The results are shown in Table 1.

TABLE 1

| | organic layer | | composite layer | | inorganic | | battery |
| | thickness [μm] | weight ratio of inorganic material/organic material | thickness [μm] | weight ratio of inorganic material/organic material | material/(weight of organic layer + weight of composite layer) | piercing strength [N] | temperature [° C.] during short circuit caused by foreign matter |
| --- | --- | --- | --- | --- | --- | --- | --- |
| Example 1 | 25.0 | 0/100 | 1.0 | 25/75 | 0.80% | 11.0 | 86 |
| Example 2 | 25.0 | 0/100 | 5.0 | 35/65 | 5% | 11.3 | 48 |
| Example 3 | 25.0 | 0/100 | 5.0 | 70/30 | 10% | 11.0 | 35 |
| Example 4 | 25.0 | 0/100 | 1.0 | 35/65 | 1% | 11.1 | 55 |
| Comparative Example 1 | 25.0 | 0/100 | none | none | 0% | 10.8 | >100 |
| Comparative Example 2 | 25.0 | 0/100 | 5.0 | 10/90 | 1.50% | 11.6 | >100 |
| Comparative Example 3 | none | none | 25.0 | 50/50 | 50% | 7.3 | 74 |

Example 1 is the case where the organic material layer 50 has a thickness of 25 µm and contains an organic material at a weight composition ratio of 100, and the composite material layer 52 has a thickness of 1.0 µm and contains an inorganic material and an organic material at a weight composition ratio of 25:75. The piercing strength is 11.0 N, and the battery temperature during a short circuit caused by foreign matter is 86° C.

Example 2 is the case where the organic material layer 50 has a thickness of 25 µm and the composite material layer 52 has a thickness of 5.0 µm and contains an inorganic material and an organic material at a weight composition ratio of 35:65. The piercing strength is 11.3 N, and the battery temperature during a short circuit caused by foreign matter is 48° C. The composite material layer 52 in Example 2 has a larger thickness than that in Example 1, which may make the thermal resistance in Example 2 higher than that in Example 1. In Example 2 and Example 1, the organic material layer 50 is the same and the piercing strength is thus substantially the same.

Example 3 is the case where the organic material layer 50 has a thickness of 25 µm and the composite material layer 52 has a thickness of 5.0 µm and contains an inorganic material and an organic material at a weight composition ratio of 70:30. The piercing strength is 11.0 N, and the battery temperature during a short circuit caused by foreign matter is 35° C. The weight composition ratio of the inorganic material in Example 3 is higher than that in Example 2, which may make the thermal resistance in Example 3 higher than that in Example 2. In Example 3 and Example 2, the organic material layer 50 is the same and the piercing strength is thus substantially the same.

Example 4 is the case where the organic material layer 50 has a thickness of 25 µm and the composite material layer 52 has a thickness of 1.0 µm and contains an inorganic material and an organic material at a weight composition ratio of 35:65. The piercing strength is 11.1 N, and the battery temperature during a short circuit caused by foreign matter is 55° C. The weight composition ratio of the inorganic material in Example 4 is higher than that in Example 1, which may make the thermal resistance in Example 4 higher than that in Example 1.

Comparative Example 1 is the case where the organic material layer 50 has a thickness of 25 µm and the composite material layer 52 is not formed. The piercing strength is 10.8 N, and the battery temperature during a short circuit caused by foreign matter exceeds 100° C. In Comparative Example 1, the composite material layer 52 is not present, and only the organic material layer 50 and the adhesive layer 54 are present, which indicates that the thermal resistance is not ensured.

Comparative Example 2 is the case where the organic material layer 50 has a thickness of 25 µm and the composite material layer 52 has a thickness of 5.0 µm and contains an inorganic material and an organic material at a weight composition ratio of 10:90. The piercing strength is 11.6 N, and the battery temperature during a short circuit caused by foreign matter exceeds 100° C. The weight composition ratio of the inorganic material in Comparative Example 2 is lower than that in Example 1, which may make the thermal resistance in Comparative Example 2 lower than that in Example 1.

Comparative Example 3 is the case where the organic material layer 50 is not present and the composite material layer 52 has a thickness of 5.0 µm and contains an inorganic material and an organic material at a weight composition ratio of 50:50. The piercing strength is 7.3 N, and the battery temperature during a short circuit caused by foreign matter is 74° C. In Comparative Example 3, the organic material layer 50 is not present compared with Example 1, which may reduce the piercing strength. The weight composition ratio of the inorganic material in the composite material layer 52 is high, which may improve the thermal resistance.

According to the results described above, both the thermal resistance and the piercing strength (mechanical strength) are achieved by the insulating tape having a three-layer structure of the organic material layer 50/the composite material layer 52/the adhesive layer 54. To ensure the thermal resistance, the weight composition ratio of the inorganic material in the composite material layer 52 is 20% or more and preferably 35% to 80%, and the thickness of the composite material layer 52 is preferably 1 µm to 5 µm.

In this embodiment, as illustrated in FIG. 1, the insulating tape 1 is formed by sequentially stacking the organic material layer 50/the composite material layer 52/the adhesive layer 54. However, the stacking sequence may be changed and the insulating tape 1 may include the composite material layer 52/the organic material layer 50/the adhesive layer 54.

Figure 2:
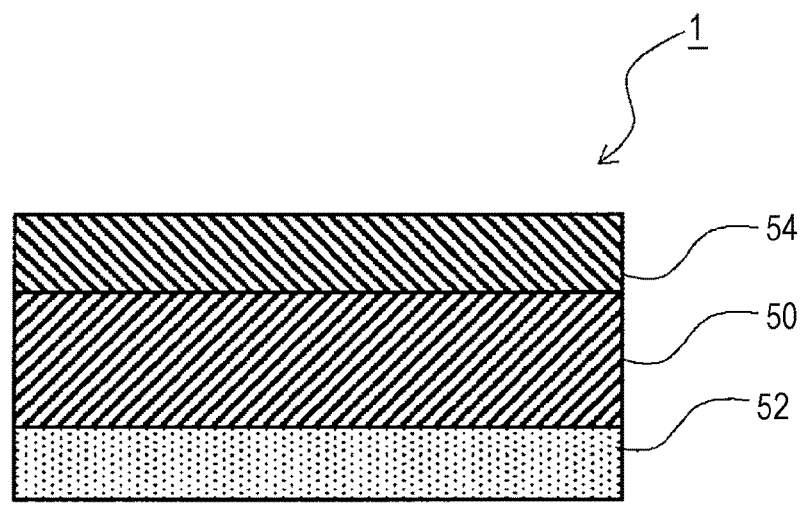
FIG. 2 is a partial sectional view of an insulating tape in another embodiment.

FIG. 2 is a sectional view of an insulating tape 1 in this case. The insulating tape 1 is formed by sequentially stacking the composite material layer 52/the organic material layer 50/the adhesive layer 54. In short, the insulating tape 1 includes the organic material layer 50, the composite material layer 52, and the adhesive layer 54.

In this embodiment, the insulating tape 1 includes the organic material layer 50, the composite material layer 52, and the adhesive layer 54 and may further include an auxiliary layer in addition to these layers. For example, the composite material layer 52 itself may have a multilayer structure, and each layer may contain an organic material and an inorganic material at a different weight ratio.

Figure 3:
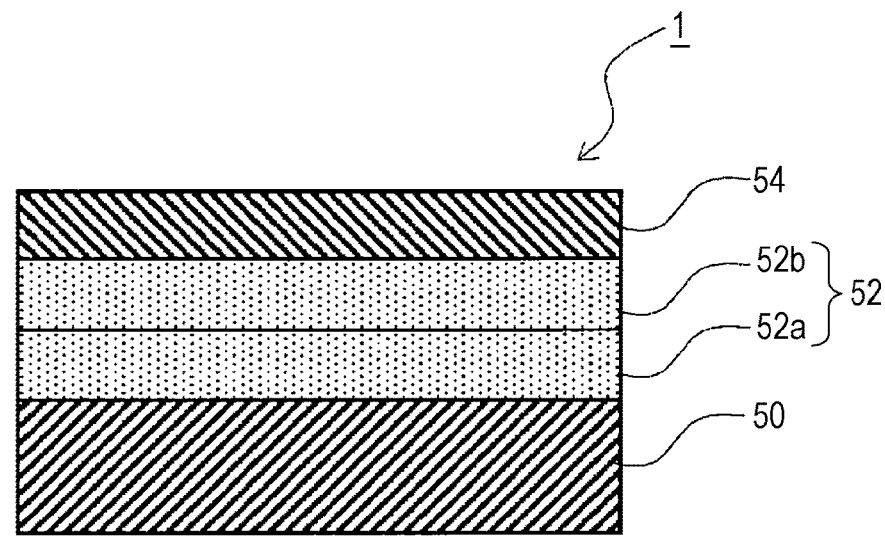
FIG. 3 is a partial sectional view of an insulating tape in still another embodiment.

FIG. 3 is a sectional view of an insulating tape 1 in this case. The insulating tape 1 is formed by sequentially stacking the organic material layer 50/the composite material layer 52/the adhesive layer 54 in the same manner as in FIG. 1. The composite material layer 52 includes two layers: a composite material layer 52a and a composite material layer 52b. The composite material layer 52a and the composite material layer 52b contain an organic material and an inorganic material at a different weight composition ratio. In both the composite material layer 52a and the composite material layer 52b, the inorganic material preferably accounts for 20% or more of the weight of the composite material layer. In FIG. 3, at least one of the organic material and the inorganic material may be different in the composite material layer 52a and the composite material layer 52b.

INDUSTRIAL APPLICABILITY

The non-aqueous electrolyte secondary batteries of the embodiments can be used in applications pertaining to, for example, driving power sources of portable information terminals, such as mobile phones, laptop computers, smart phones, and tablet terminals, particularly in applications requiring high energy density. The non-aqueous electrolyte secondary batteries of the embodiments can also be used in applications pertaining to electric vehicles (EVs), hybrid electric vehicles (HEVs, PHEVs), and power tools.

REFERENCE SIGNS LIST

1 Insulating Tape
50 Organic Material Layer
52 Composite Material Layer
54 Adhesive Layer

The invention claimed is:

1. A non-aqueous electrolyte secondary battery comprising:
a positive electrode including a positive electrode current collector, a positive electrode active material layer famed on the positive electrode current collector and containing a lithium transition metal composite oxide, and a positive electrode tab welded to a positive electrode current collector-exposed surface;
a negative electrode including a negative electrode current collector and a negative electrode active material formed on the negative electrode current collector; and
a separator between the positive electrode and the negative electrode,
wherein the positive electrode includes an insulating tape that covers a welded part between the positive electrode tab and the positive electrode current collector-exposed surface,
wherein the insulating tape has a multilayer structure including an organic material layer and a composite material layer containing an organic material and an inorganic material, and
wherein the inorganic material in the composite material layer accounts for 20% or more of a weight of the composite material layer,
wherein the organic material contained in the composite material layer is formed of a resin which is adhesive at room temperature, and
wherein the organic material layer is a layer mainly composed of at least one of the group consisting of polyimide, polypropylene or polyethylene terephthalate.

2. The non-aqueous electrolyte secondary battery according to claim 1,
wherein the inorganic material in the composite material layer accounts for 35% or more and 80% or less of the weight of the composite material layer.

3. The non-aqueous electrolyte secondary battery according to claim 1,
wherein the composite material layer has a thickness of 1 μm or more and 5 μm or less.

4. The non-aqueous electrolyte secondary battery according to claim 1, wherein a weight of the inorganic material is less than 20% of a total weight of the composite material layer and the organic material layer.

5. The non-aqueous electrolyte secondary battery according to claim 1,
wherein the insulating tape includes:
the organic material layer;
the composite material layer formed on the organic material layer; and
an adhesive layer formed on the composite material layer.

6. The non-aqueous electrolyte secondary battery according to claim 1,
wherein the insulating tape includes:
the organic material layer;
the composite material layer formed under the organic material layer; and
an adhesive layer formed on the organic material layer.

7. The non-aqueous electrolyte secondary battery according to claim 2, wherein a weight of the inorganic material is less than 20% of a total weight of the composite material layer and the organic material layer.

8. The non-aqueous electrolyte secondary battery according to claim 1,
wherein the organic material contained in the composite material layer is at least one of the group consisting of a rubber-based resin and an acrylic-based resin.

9. A non-aqueous electrolyte secondary battery comprising:
a positive electrode including a positive electrode current collector, a positive electrode active material layer famed on the positive electrode current collector and containing a lithium transition metal composite oxide, and a positive electrode tab welded to a positive electrode current collector-exposed surface;
a negative electrode including a negative electrode current collector and a negative electrode active material formed on the negative electrode current collector; and
a separator between the positive electrode and the negative electrode,
wherein the positive electrode includes an insulating tape that covers a welded part between the positive electrode tab and the positive electrode current collector-exposed surface,
wherein the insulating tape has a multilayer structure including an organic material layer and a composite material layer containing an organic material and an inorganic material, and
wherein the organic material contained in the composite material layer is formed of a resin which is adhesive at room temperature,
wherein the inorganic material in the composite material layer accounts for 35% or more and 80% or less of the weight of the composite material layer, and
wherein a weight of the inorganic material is 10% or less of a total weight of the composite material layer and the organic material layer.

10. The non-aqueous electrolyte secondary battery according to claim 9,
wherein the organic material layer is a layer mainly composed of at least one of the group consisting of polyimide, polypropylene, or polyethylene terephthalate.

11. A non-aqueous electrolyte secondary battery comprising:
a positive electrode including a positive electrode current collector, a positive electrode active material layer formed on the positive electrode current collector and containing a lithium transition metal composite oxide, and a positive electrode tab welded to a positive electrode current collector-exposed surface;
a negative electrode including a negative electrode current collector and a negative electrode active material formed on the negative electrode current collector; and
a separator between the positive electrode and the negative electrode,
wherein the positive electrode includes an insulating tape that covers a welded part between the positive electrode tab and the positive electrode current collector-exposed surface,
wherein the insulating tape has a multilayer structure including an organic material layer and a composite material layer containing an organic material and an inorganic material, and
wherein the inorganic material in the composite material layer accounts for 20% or more of a weight of the composite material layer,
wherein the organic material contained in the composite material layer is at least one of the group consisting of a rubber-based resin and an acrylic-based resin, and wherein the organic material layer is a layer mainly composed of at least one of the group consisting of polyimide, polypropylene and polyethylene terephthalate.

12. The non-aqueous electrolyte secondary battery according to claim 11, wherein the inorganic material in the composite material layer accounts for 35% or more and 80% or less of the weight of the composite material layer.

13. The non-aqueous electrolyte secondary battery according to claim 11, wherein the composite material layer has a thickness of 1 μm or more and 5 μm or less.

14. The non-aqueous electrolyte secondary battery according to claim 11, wherein a weight of the inorganic material is less than 20% of a total weight of the composite material layer and the organic material layer.

15. The non-aqueous electrolyte secondary battery according to claim 11,
wherein the insulating tape includes:
the organic material layer;
the composite material layer formed on the organic material layer; and
an adhesive layer formed on the composite material layer.

16. The non-aqueous electrolyte secondary battery according to claim 11,
wherein the insulating tape includes:
the organic material layer;
the composite material layer formed under the organic material layer; and
an adhesive layer formed on the organic material layer.

17. A non-aqueous electrolyte secondary battery comprising:
a positive electrode including a positive electrode current collector, a positive electrode active material layer formed on the positive electrode current collector and containing a lithium transition metal composite oxide, and a positive electrode tab welded to a positive electrode current collector-exposed surface;
a negative electrode including a negative electrode current collector and a negative electrode active material formed on the negative electrode current collector; and
a separator between the positive electrode and the negative electrode,
wherein the positive electrode includes an insulating tape that covers a welded part between the positive electrode tab and the positive electrode current collector-exposed surface,
wherein the insulating tape has a multilayer structure including an organic material layer and a composite material layer containing an organic material and an inorganic material,
wherein the organic material contained in the composite material layer is at least one of the group consisting of a rubber-based resin and an acrylic-based resin,
wherein the inorganic material in the composite material layer accounts for 35% or more and 80% or less of the weight of the composite material layer, and
wherein a weight of the inorganic material is 10% or less of a total weight of the composite material layer and the organic material layer.

18. The non-aqueous electrolyte secondary battery according to claim 17,
wherein the organic material layer is a layer mainly composed of at least one of the group consisting of polyimide, polypropylene and polyethylene terephthalate.

\* \* \* \* \*